US012676800B2

(12) United States Patent
Zeng et al.

(10) Patent No.: US 12,676,800 B2
(45) Date of Patent: Jul. 7, 2026

(54) OPERATION AND MAINTENANCE METHOD AND APPARATUS, SYSTEM, SERVER, ELECTRONIC DEVICE, AND MEDIUM

(71) Applicant: ZTE CORPORATION, Shenzhen (CN)

(72) Inventors: Gang Zeng, Shenzhen (CN); Lin Huang, Shenzhen (CN); Kan Qiu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 263 days.

(21) Appl. No.: 18/559,594

(22) PCT Filed: Apr. 14, 2022

(86) PCT No.: PCT/CN2022/086797
§ 371 (c)(1),
(2) Date: Nov. 8, 2023

(87) PCT Pub. No.: WO2022/237447
PCT Pub. Date: Nov. 17, 2022

(65) Prior Publication Data
US 2024/0243978 A1 Jul. 18, 2024

(30) Foreign Application Priority Data
May 10, 2021 (CN) .......................... 202110504224.6

(51) Int. Cl.
*H04L 41/5019* (2022.01)
*H04L 41/046* (2022.01)

(52) U.S. Cl.
CPC ........ *H04L 41/5019* (2013.01); *H04L 41/046* (2013.01)

(58) Field of Classification Search
CPC ............... H04L 41/5019; H04L 41/046; H04L 41/0895; H04L 41/0806; H04L 41/0853; H04L 41/5041; H04W 24/04
See application file for complete search history.

(56) References Cited

U.S. PATENT DOCUMENTS

| | | | |
|---|---|---|---|
| 2014/0122941 A1* | 5/2014 | Pan ..................... | G06F 11/1484 |
| | | | 714/45 |
| 2020/0110631 A1* | 4/2020 | Chen ..................... | G06F 9/5077 |
| 2021/0021487 A1* | 1/2021 | Takla ..................... | H04L 43/20 |

FOREIGN PATENT DOCUMENTS

| | | |
|---|---|---|
| CN | 104657150 A | 5/2015 |
| CN | 111526049 A | 8/2020 |

(Continued)

OTHER PUBLICATIONS

European Patent Office, the Extended European Search Report dated Mar. 25, 2025, for corresponding EP application No. 22806417.6.

(Continued)

*Primary Examiner* — Soe Hlaing
(74) *Attorney, Agent, or Firm* — Li & Cai Intellectual Property (USA) Office

(57) ABSTRACT

The present disclosure discloses an operation and maintenance method, apparatus, and system, a server, an electronic device, and a medium. The method includes: searching for an operation and maintenance service capability based on an operation and maintenance request to determine a service agent device and an operation and maintenance instruction corresponding to the service agent device, wherein the service agent device is provided in a container and provides an operation and maintenance service, and the operation and maintenance service capability is a service capability of the service agent device determined based on operation and maintenance data of the container; and sending the operation (Continued)

and maintenance instruction corresponding to the service agent device to the service agent device for the service agent device to execute the operation and maintenance instruction.

16 Claims, 6 Drawing Sheets

(56)                    References Cited

FOREIGN PATENT DOCUMENTS

| | | |
|---|---|---|
| CN | 111984270 A | 11/2020 |
| WO | WO 2020226659 A1 | 11/2020 |

OTHER PUBLICATIONS

Japan Patent Office, first Office Action dated Oct. 8, 2024, for corresponding JP application No. 2023-568713.
3rd Generation Partnership Project; Technical Specification Group Services and system Aspects No. 1-Architecture enhancements for 5G System (5GS)to support network data analytics services(Release 17). 3GPP TS 23.288 V170.0 Mar. 2021, pp. 13-14, 19.
3rd Generation Partnership Project; Technical Specification Group Services and system Aspects System architecture for the 5G System (5GS) stage 2(Release 17). 3GPP TS 23.501 V170.0 Mar. 2021, pp. 379 451-452.

* cited by examiner

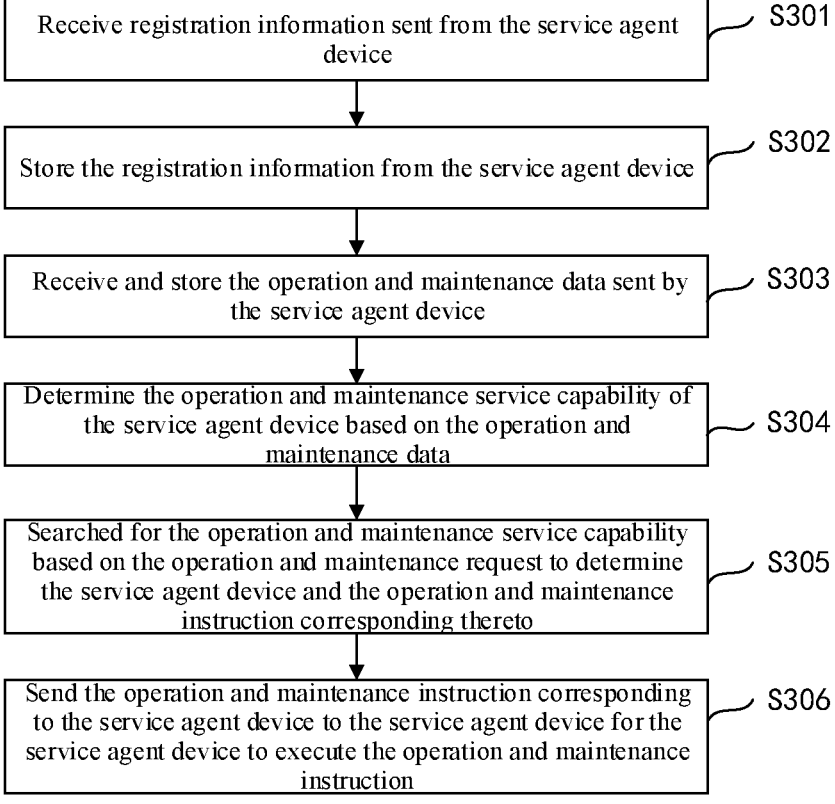

| Receive registration information sent from the service agent device | S301 |

| Store the registration information from the service agent device | S302 |

| Receive and store the operation and maintenance data sent by the service agent device | S303 |

| Determine the operation and maintenance service capability of the service agent device based on the operation and maintenance data | S304 |

| Searched for the operation and maintenance service capability based on the operation and maintenance request to determine the service agent device and the operation and maintenance instruction corresponding thereto | S305 |

| Send the operation and maintenance instruction corresponding to the service agent device to the service agent device for the service agent device to execute the operation and maintenance instruction | S306 |

FIG. 3

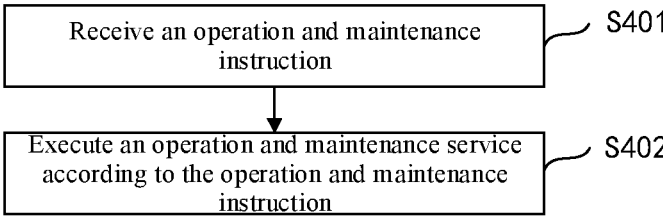

| Receive an operation and maintenance instruction | S401 |

| Execute an operation and maintenance service according to the operation and maintenance instruction | S402 |

FIG. 4

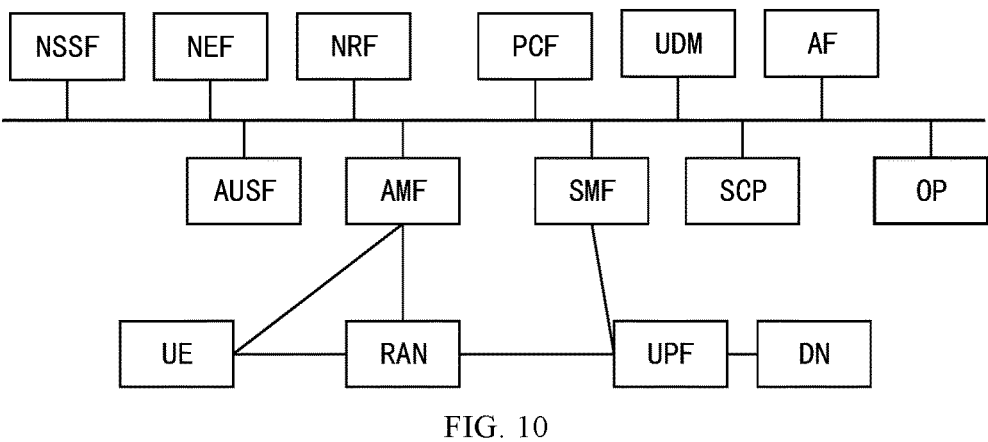

FIG. 10

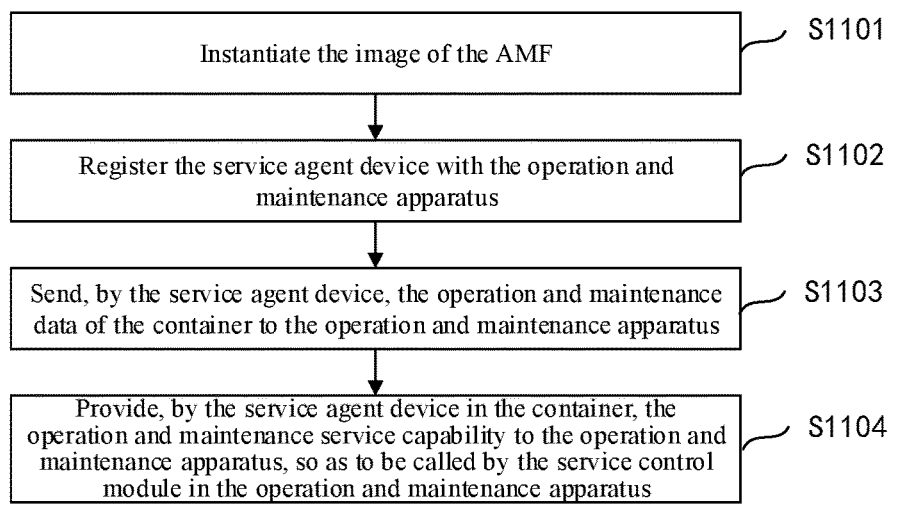

| | |
|---|---|
| Instantiate the image of the AMF | S1101 |
| Register the service agent device with the operation and maintenance apparatus | S1102 |
| Send, by the service agent device, the operation and maintenance data of the container to the operation and maintenance apparatus | S1103 |
| Provide, by the service agent device in the container, the operation and maintenance service capability to the operation and maintenance apparatus, so as to be called by the service control module in the operation and maintenance apparatus | S1104 |

FIG. 11

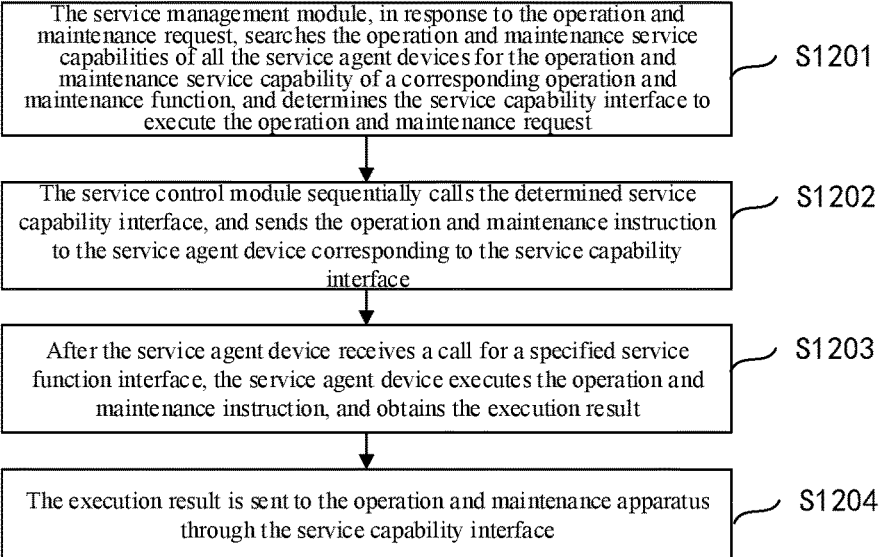

| | |
|---|---|
| The service management module, in response to the operation and maintenance request, searches the operation and maintenance service capabilities of all the service agent devices for the operation and maintenance service capability of a corresponding operation and maintenance function, and determines the service capability interface to execute the operation and maintenance request | S1201 |
| The service control module sequentially calls the determined service capability interface, and sends the operation and maintenance instruction to the service agent device corresponding to the service capability interface | S1202 |
| After the service agent device receives a call for a specified service function interface, the service agent device executes the operation and maintenance instruction, and obtains the execution result | S1203 |
| The execution result is sent to the operation and maintenance apparatus through the service capability interface | S1204 |

OPERATION AND MAINTENANCE METHOD AND APPARATUS, SYSTEM, SERVER, ELECTRONIC DEVICE, AND MEDIUM

CROSS-REFERENCE TO RELATED APPLICATIONS

The present disclosure claims the priority to Chinese Patent Application No. 202110504224.6 entitled "OPERATION AND MAINTENANCE METHOD AND APPARATUS, SYSTEM, SERVER, ELECTRONIC DEVICE, AND MEDIUM" and filed with the CNIPA on May 10, 2021, the contents of which are incorporated herein by reference in their entirety.

TECHNICAL FIELD

Embodiments of the present disclosure relate to, but are not limited to, the field of computer and communication technology, and particularly relate to an operation and maintenance method and apparatus, system, a server, an electronic device, and a medium.

BACKGROUND

With the continuous improvement of the fifth generation (5th-Generation, 5G) network technology, 5G networks gradually develop towards virtualization and containerization. The virtualization technology solves the problem of loose coupling between hardware and software, and the containerization technology provides technical support for service-oriented application scenarios.

Due to access of massive terminals, the capacity of the 5G networks becomes larger and larger, and the number of containers is doubled and redoubled. Since the containers are isolated from the outside and service processes in the containers are also isolated from external resources, an operation and maintenance management system needs to establish TCP/IP connection with the containers to issue operation and maintenance instructions and monitor operation states of the containers, which leads to certain difficulty in operation and maintenance management of the 5G networks. Moreover, since operation and maintenance data and service data are transmitted in a same network, transmission efficiency of the service data is hindered.

SUMMARY

The embodiments of the present disclosure mainly aim to provide an operation and maintenance method, apparatus, and system, a server, an electronic device, and a medium, so as to simplify difficulty in operation and maintenance management and increase transmission efficiency of service messages.

In a first aspect, an embodiment of the present disclosure provides an operation and maintenance method, including searching for an operation and maintenance service capability based on an operation and maintenance request to determine a service agent device and an operation and maintenance instruction corresponding to the service agent device, wherein the service agent device is provided in a container and provides an operation and maintenance service, and the operation and maintenance service capability is a service capability of the service agent device determined based on operation and maintenance data of the container; and

sending the operation and maintenance instruction corresponding to the service agent device to the service agent device for the service agent device to execute the operation and maintenance instruction.

In a second aspect, an embodiment of the present disclosure provides an operation and maintenance method applicable to a service agent device which is provided in a container and provides an operation and maintenance service, including:

receiving an operation and maintenance instruction, wherein the operation and maintenance instruction is an instruction which corresponds to a service agent device to execute the operation and maintenance service and which is determined by an operation and maintenance apparatus searching for an operation and maintenance service capability based on an operation and maintenance request; and the operation and maintenance service capability is a capability of the service agent device to implement the operation and maintenance service; and executing the operation and maintenance service according to the operation and maintenance instruction.

In a third aspect, an embodiment of the present disclosure provides an operation and maintenance apparatus, including:

a service management module configured to manage an operation and maintenance service capability provided by a service agent device; wherein the service agent device is provided in a container and provides an operation and maintenance service, and the operation and maintenance service capability is a capability of the service agent device to implement the operation and maintenance service;

a service control module configured to determine the service agent device and an operation and maintenance instruction corresponding to the service agent device based on an operation and maintenance request and the operation and maintenance service capability of the service agent device, wherein the operation and maintenance request is a request made by a user; and a service capability interface configured to receive the operation and maintenance instruction and send the operation and maintenance instruction to the service agent device for the service agent device to execute the operation and maintenance instruction.

In a fourth aspect, an embodiment of the present disclosure provides a service agent device provided in a container, including:

a receiving module configured to receive an operation and maintenance instruction; wherein the operation and maintenance instruction is an instruction which corresponds to a service agent device to execute the operation and maintenance service and which is determined by an operation and maintenance apparatus searching for an operation and maintenance service capability based on an operation and maintenance request, and the operation and maintenance service capability is a capability of the service agent device to implement the operation and maintenance service; and an execution module configured to execute the operation and maintenance service according to the operation and maintenance instruction.

In a fifth aspect, an embodiment of the present disclosure provides operation and maintenance management system, including an operation and maintenance apparatus and a service agent device, which are in signal connection with each other;

the operation and maintenance apparatus adopts the operation and maintenance apparatus provided by any one of the embodiments of the present disclosure; and the service agent device adopts the service agent device provided by any one of the embodiments of the present disclosure.

In a sixth aspect, an embodiment of the present disclosure provides a server, which includes a virtual container, and further includes an operation and maintenance management system adopting the operation and maintenance management system provided by the embodiment of the present disclosure, and the service agent device is provided in the container.

In a seventh aspect, an embodiment of the present disclosure provides an electronic device, including:

one or more processors;

a memory having stored thereon one or more programs which, when executed by the one or more processors, cause the one or more processors to implement the method provided by any one of the embodiments of the present disclosure; and one or more input/output (I/O) interfaces connected between the one or more processors and the memory, and configured to enable information interaction between the one or more processors and the memory.

In an eighth aspect, an embodiment of the present disclosure provides a computer-readable medium computer-readable medium having stored thereon a computer program which, when executed by a processor, implements the method provided by any one of the embodiments of the present disclosure.

According to the operation and maintenance method provided by the embodiments of the present disclosure, the operation and maintenance service capability is searched for based on the operation and maintenance request to determine the service agent device and the operation and maintenance instruction corresponding thereto, and the operation and maintenance instruction corresponding to the service agent device is sent to the service agent device for the service agent device to execute the corresponding operation and maintenance instruction. The operation and maintenance service capability is the service capability of the service agent device determined based on the operation and maintenance data of the container, and the operation and maintenance task is performed by the service agent device, so that an operation and maintenance management mode is simplified, the execution of the operation and maintenance instruction by the service agent device is not affected by a size of the container, and the problem of difficulty in operation and maintenance management of large-capacity containers is solved; moreover, since the service agent device and service data of the containers can adopt different networks for transmission, an influence of operation and maintenance management on the transmission of the service data is avoided, and transmission efficiency and stability of the service data is increased.

The above embodiments and other aspects of the present disclosure and the implementations thereof will be further described in the BRIEF DESCRIPTION OF THE DRAWINGS, the DETAIL DESCRIPTION OF EMBODIMENTS, and the Claims.

BRIEF DESCRIPTION OF DRAWINGS

FIG. 3 is another flowchart illustrating an operation and maintenance method according to an embodiment of the present disclosure;

FIG. 4 is yet another flowchart illustrating an operation and maintenance method according to an embodiment of the present disclosure;

FIG. 10 is a schematic diagram illustrating an operation and maintenance application scenario according to an embodiment of the present disclosure;

FIG. 11 is a schematic diagram illustrating a start process of an operation and maintenance management system according to an embodiment of the present disclosure;

FIG. 12 is a schematic diagram illustrating a service process of an operation and maintenance management system according to an embodiment of the present disclosure;

DETAIL DESCRIPTION OF EMBODIMENTS

Figure 1:
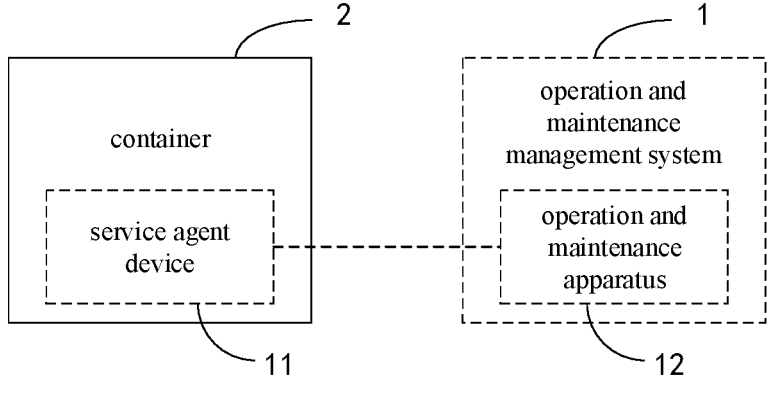
FIG. 1 is a schematic diagram illustrating an application scenario of the technical solutions according to the embodiments of the present disclosure.

In order to enable those of ordinary skill in the art to better understand the technical solutions of the present disclosure, a server provided by the present disclosure is described in detail below with reference to the drawings.

Exemplary embodiments will be described more fully below with reference to the drawings, but the exemplary embodiments described may be embodied in different forms, and should not be interpreted as being limited to the embodiments described herein. Rather, the embodiments are provided to make the present disclosure thorough and complete, and are intended to enable those of ordinary skill in the art to fully understand the scope of the present disclosure.

The term "and/or" used herein includes any and all combinations of one or more associated listed items.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The embodiments described herein can be described with reference to plans and/or cross-sectional views with the aid of idealized schematic diagrams of the present disclosure. Accordingly, the exemplary drawings may be modified according to manufacturing techniques and/or tolerances. Therefore, the embodiments are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

The technical solutions provided by the embodiments of the present disclosure can be applied to a communication network, such as a 5G network, and can also be applied to other containerization networks, such as a containerization internet.

In order to facilitate understanding of the embodiments of the present disclosure, an application scenario to which the embodiments of the present disclosure are applicable is described in detail with reference to FIG. 1. FIG. 1 is a schematic diagram illustrating an application scenario of the technical solutions according to the embodiments of the present disclosure. As shown in FIG. 1, the technical solutions provided by the embodiments of the present disclosure involve an operation and maintenance management system 1 and a container 2 which is a virtualized network element, and different containers 2 may perform a same function or different functions. The operation and maintenance management system 1 is configured to acquire operation parameters of the container 2 and perform maintenance and operation management on the container 2. A user sends an operation and maintenance request to the operation and maintenance management system 1, and the operation and maintenance management system 1 executes a corresponding operation based on the operation and maintenance request.

The operation and maintenance management system 1 includes a service agent device 11 and an operation and maintenance apparatus 12. The service agent device 11 is configured to receive the operation and maintenance request of the user, and determine the service agent device 11 to execute a service based on the operation and maintenance request, and the service agent device 11 is provided in the container, and execute the corresponding operation after receiving an execution instruction from the operation and maintenance apparatus 12.

In a first aspect, an embodiment of the present disclosure provides an operation and maintenance method, which is proposed based on the Service Based Architecture (SBA), and may be applied to an operation and maintenance apparatus.

Figure 2:
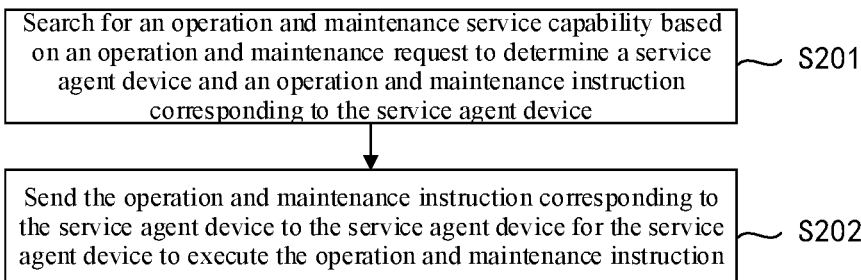
FIG. 2 is a flowchart illustrating an operation and maintenance method according to an embodiment of the present disclosure.

FIG. 2 is a flowchart illustrating an operation and maintenance method according to an embodiment of the present disclosure. As shown in FIG. 2, the operation and maintenance method includes:

operation S201, searching for an operation and maintenance service capability based on an operation and maintenance request to determine a service agent device and an operation and maintenance instruction corresponding to the service agent device.

The service agent device is provided in a container and provides an operation and maintenance service, and the operation and maintenance service capability is a capability of the service agent device to implement the operation and maintenance services.

In some embodiments, the operation and maintenance request may be initiated manually by a user or initiated automatically by a terminal used by the user. The service agent device may collect operation and maintenance data of a service module in the container, and send the operation and maintenance data to the operation and maintenance apparatus, so as to allow the operation and maintenance apparatus to select the service agent device and the operation and maintenance instruction thereto based on the operation and maintenance data.

It should be noted that the operation and maintenance apparatus may select one service agent device to execute the operation and maintenance request, or may select a plurality of service agent devices to execute the operation and maintenance request. When a service capability needed by the operation and maintenance request exceeds a service capability of one service agent device, the operation and maintenance apparatus may select a plurality of service agent devices to execute the operation and maintenance request, that is, the operation and maintenance apparatus selects the plurality of service agent devices according to the operation and maintenance request and the service capabilities of the service agent devices, splits the operation and maintenance request into a plurality of operation and maintenance tasks, and assigns the operation and maintenance tasks to the plurality of service agent devices to complete, with each service agent device performing one operation and maintenance task. Moreover, the plurality of service agent devices may perform the respective operation and maintenance tasks simultaneously or in a preset sequence.

In some embodiments, when the operation and maintenance apparatus selects the plurality of service agent devices, the operation and maintenance task to be performed by each service agent device is determined according to the service capabilities of the service agent devices. For different service agent devices determined by the operation and maintenance apparatus, different operation and maintenance instructions are generated.

The operation and maintenance instruction generated by the operation and maintenance apparatus includes the operation and maintenance task, i.e., the number of services to be executed by the service agent device, and may further include an identification of the service agent device, so as to facilitate identification of the service agent device by the operation and maintenance apparatus.

In operation S202, the operation and maintenance instruction corresponding to the service agent device is sent to the service agent device for the service agent device to execute the operation and maintenance instruction.

The operation and maintenance instruction is an instruction issued by the operation and maintenance apparatus to the service agent device, and the service agent device performs the corresponding operation and maintenance task according to the operation and maintenance instruction. After receiving the operation and maintenance instruction, the service agent device performs the operation and maintenance task according to the operation and maintenance instruction.

According to the operation and maintenance method provided by the present embodiment, the operation and maintenance service capability is searched for based on the operation and maintenance request to determine the service agent device and the operation and maintenance instruction corresponding thereto, and the operation and maintenance instruction corresponding to the service agent device is sent to the service agent device for the service agent device to execute the corresponding operation and maintenance instruction. The operation and maintenance service capability is the service capability of the service agent device determined based on the operation and maintenance data of the container, and the operation and maintenance task is performed by the service agent device, so that an operation and maintenance management mode is simplified, and the problem of difficulty in operation and maintenance management of large-capacity containers is solved; moreover, since the service agent device and service data of the containers can adopt different networks for transmission, an influence of operation and maintenance management on the service data is avoided, and transmission efficiency of the service data is increased.

In some embodiments, searching for the operation and maintenance service capability based on the operation and maintenance request to determine the service agent device and the operation and maintenance instruction corresponding to the service agent device includes: searching for the operation and maintenance service capability of the service agent device based on the operation and maintenance request to determine the service agent device to execute the operation and maintenance request and an operation and maintenance task corresponding to the service agent device; and determining the operation and maintenance instruction corresponding to the service agent device based on the operation and maintenance task corresponding to the service agent device.

When the operation and maintenance request needs a relatively high service capability and exceeds a service capability of any one service agent device, an operation and maintenance service according to the operation and maintenance request is provided by a plurality of service agent devices. When the operation and maintenance request needs a relatively high service capability, even if the service capability does not exceed the service agent device of the service agent device, a plurality of service agent devices may be selected to provide the operation and maintenance service in order to increase operation and maintenance efficiency.

In some embodiments, the operation and maintenance apparatus determines the service agent device according to the operation and maintenance request and the operation and maintenance service capability of the service agent device, and then determines the operation and maintenance instruction for the service agent device.

In an exemplary embodiment, the operation and maintenance apparatus analyzes the operation and maintenance request, determines the service capability needed by the operation and maintenance request, selects the service agent device to execute the operation and maintenance request based on the service capability needed by the operation and maintenance request and the operation and maintenance service capability of each service agent device, determines the operation and maintenance task for the selected service agent device, and then determines the operation and maintenance instruction.

In some embodiments, a service capability interface corresponds to the service agent device, and the operation and maintenance apparatus may determine the service agent device by searching for the service capability interface. After the service agent device is registered in the operation and maintenance apparatus, the service agent device, the service capability interface, and the service capability are bound, and the operation and maintenance apparatus may determine the service agent device and the service capability corresponding thereto by searching for the service capability interface.

In some embodiments, the service agent device collects the operation and maintenance data of each service module in the container, and sends the operation and maintenance data to the operation and maintenance apparatus through the service capability interface, and the operation and maintenance apparatus may obtain the service capability of the service agent device according to the operation and maintenance data.

The operation and maintenance data includes one or more of operation environment parameter, system state, service process state, and service index of the service module in the container. The operation and maintenance apparatus may determine the operation and maintenance service capability of the service agent device according to one or more of the operation environment parameter, the system state, the service process state, and the service index In some embodiments, the service agent device may define the operation and maintenance data such as source, type, time, and data content of the operation and maintenance data according to actual needs.

FIG. 3 is another flowchart illustrating an operation and maintenance method according to an embodiment of the a present disclosure. As shown in FIG. 3, the operation and maintenance method includes the following operations 301 to 306.

In operation S301, registration information sent from the service agent device is received.

The service agent device sends the registration information to the operation and maintenance apparatus to register the service capability interface corresponding to the service agent device in the operation and maintenance apparatus. The service agent device is provided in the container and provides the operation and maintenance service, and the registration information includes information of the service capability interface corresponding to the service agent device. The operation and maintenance apparatus may find the service capability of the service agent device through the service capability interface.

In some embodiments, the service agent device collects the operation and maintenance data, and reports the operation and maintenance data to the operation and maintenance apparatus through the service capability interface, and the operation and maintenance apparatus may be aware of the operation and maintenance service capability of the service agent device by analyzing the operation and maintenance data.

In some embodiments, the operation and maintenance apparatus may further standardize the service capability interface, such as defining type, execution time, execution script, and execution result of the operation and maintenance instruction. By standardizing the service capability interface, operation and maintenance operations can be unified, and requirements on skills of operation and maintenance staffs can be reduced.

In operation S302, the registration information from the service agent device is stored.

In some embodiments, the operation and maintenance apparatus stores the operation and maintenance data reported by the service agent device and provides a query service.

In operation S303, the operation and maintenance data sent from the service agent device is received and stored.

The service agent device may define the operation and maintenance data, such as the source, the type, the time, and the data content of the data. In some embodiments, the operation and maintenance data includes one or more of operation environment data, system state, service process state, and service index of the container.

In operation S304, the operation and maintenance service capability of the service agent device is determined based on the operation and maintenance data.

The operation and maintenance apparatus may determine the operation and maintenance service capability of the service agent device based on the operation and maintenance data. When the operation and maintenance apparatus obtains the operation and maintenance service capabilities of a plurality of service agent devices, the operation and maintenance apparatus may determine, according to the operation and maintenance data of each service agent device, the operation and maintenance service capability corresponding to the service agent device. The operation and maintenance service capability is the capability of the service agent device to implement the operation and maintenance service.

In operation S305, the operation and maintenance service capability is searched for based on the operation and maintenance request to determine the service agent device and the operation and maintenance instruction corresponding thereto.

In some embodiments, the operation and maintenance request may be initiated manually by the user, for example, the operation and maintenance request is initiated by the user through an Application (APP). The operation and maintenance request may also be automatically initiated through a terminal used by the user.

The service agent device may collect the operation and maintenance data of the service module in the container, and send the operation and maintenance data to the operation and maintenance apparatus, so as to allow the operation and maintenance apparatus to select the service agent device to execute the operation and maintenance request based on the operation and maintenance data.

It should be noted that the operation and maintenance apparatus may select one service agent device to execute the operation and maintenance request, or may select a plurality of service agent devices to execute the operation and maintenance request. When the service capability needed by the operation and maintenance request exceeds the service capability of one service agent device, the operation and maintenance apparatus may select a plurality of service agent devices to execute the operation and maintenance request, that is, the operation and maintenance apparatus selects the plurality of service agent devices according to the operation and maintenance request and the service capabilities of the service agent devices, then splits the operation and maintenance request into a plurality of operation and maintenance tasks, and assigns the operation and maintenance tasks to the plurality of service agent devices, with each service agent device performing one operation and maintenance task. The plurality of service agent devices may execute the respective operation and maintenance tasks simultaneously or in the preset sequence.

In some embodiments, when the operation and maintenance apparatus needs to select the plurality of service agent devices to execute the operation and maintenance request, the operation and maintenance task to be executed by each of the service agent devices is determined according to the service capabilities of the service agent devices.

In addition, for different service agent devices determined by the operation and maintenance apparatus, different operation and maintenance instructions are generated. The operation and maintenance instruction generated by the operation and maintenance apparatus includes the operation and maintenance task to be executed by the service agent device, and may further include the identification of the service agent device, so as to facilitate the identification of the service agent device by the operation and maintenance apparatus.

In operation S306, the operation and maintenance instruction corresponding to the service agent device is sent to the service agent device for the service agent device to execute the operation and maintenance instruction.

The operation and maintenance instruction is the instruction issued by the operation and maintenance apparatus to the service agent device, and the service agent device performs the corresponding operation and maintenance task according to the operation and maintenance instruction. The operation and maintenance instruction includes, but is not limited to, an upgrade instruction, a query instruction for running state of process, and a query instruction for version number.

In some embodiments, after the operation S306, the method further includes receiving feedback information returned from the service agent device after executing the operation and maintenance instruction, and sending the feedback information to the user.

After receiving the operation and maintenance instruction from the operation and maintenance apparatus, the service agent device executes the operation and maintenance instruction, and then sends an execution result to the operation and maintenance apparatus.

Illustratively, after receiving an upgrade instruction, which is issued by the operation and maintenance apparatus, through the service capability interface, the service agent device controls the container to execute the upgrade instruction, and sends an execution result to the operation and maintenance apparatus.

According to the operation and maintenance method provided by the present embodiment, the operation and maintenance service capability is searched for based on the operation and maintenance request to determine the service agent device and the operation and maintenance instruction corresponding thereto, and the operation and maintenance instruction corresponding to the service agent device is sent to the service agent device for the service agent device to execute the corresponding operation and maintenance instruction. The operation and maintenance service capability is the service capability of the service agent device determined based on the operation and maintenance data of the container, and the operation and maintenance task is performed by the service agent device, so that the operation and maintenance management mode is simplified, and the problem of difficulty in operation and maintenance management of large-capacity containers is solved. Moreover, since the service agent device and service data of the containers can adopt different networks for transmission, the influence of operation and maintenance management on the service data is avoided, the transmission efficiency of the service data is increased, and stability of the service data is improved.

In a second aspect, a present embodiment provides an operation and maintenance method, which is proposed based on the SBA, and may be applied to a service agent device provided in a container for providing an operation and maintenance service.

FIG. 4 is yet another flowchart illustrating an operation and maintenance method according to an embodiment of the present disclosure. As shown in FIG. 4, the operation and maintenance method includes:

operation S401, receiving an operation and maintenance instruction.

The operation and maintenance instruction is an instruction which corresponds to a service agent device to execute the operation and maintenance service and which is determined by an operation and maintenance apparatus searching for an operation and maintenance service capability based on an operation and maintenance request; and the operation and maintenance service capability is a capability of the service agent device to implement the operation and maintenance service.

In some embodiments, the operation and maintenance request may be initiated manually by a user, for example, the operation and maintenance request is initiated by the user through an APP. The operation and maintenance request may also be automatically initiated through a terminal used by the user.

The service agent device may collect operation and maintenance data of a service module in the container, and send the operation and maintenance data to the operation and maintenance apparatus, so as to allow the operation and maintenance apparatus to select the service agent device to execute the operation and maintenance request based on the operation and maintenance data. The operation and maintenance data includes one or more of operation environment data, system state, service process state, and service index of the container. The service agent device may define the operation and maintenance data such as source, type, time, and data content of the data.

In some embodiments, the operation and maintenance apparatus determines the operation and maintenance service capability of the service agent device based on the operation and maintenance data. When the operation and maintenance apparatus obtains operation and maintenance service capabilities of a plurality of service agent devices, the operation and maintenance apparatus may determine, according to the operation and maintenance data of each service agent device, the operation and maintenance service capability corresponding to the service agent device.

It should be noted that the operation and maintenance apparatus may select one service agent device to execute the operation and maintenance request, or may select a plurality of service agent devices to execute the operation and maintenance request. When a service capability needed by the operation and maintenance request exceeds a service capability of one service agent device, the operation and maintenance apparatus may select a plurality of service agent devices to execute the operation and maintenance request, that is, the operation and maintenance apparatus selects the plurality of service agent devices according to the operation and maintenance request and the service capabilities of the service agent devices, then splits the operation and maintenance request into a plurality of operation and maintenance tasks, and assigns the operation and maintenance tasks to the plurality of service agent devices, with each service agent device performing one operation and maintenance task. The plurality of service agent devices may perform the respective operation and maintenance tasks simultaneously or in a preset sequence.

In some embodiments, when the operation and maintenance apparatus needs to select the plurality of service agent devices to execute the operation and maintenance request, the operation and maintenance task to be executed by each of the service agent devices is determined according to the service capabilities of the service agent devices.

In addition, for different service agent devices determined by the operation and maintenance apparatus, different operation and maintenance instructions are generated. The operation and maintenance instruction generated by the operation and maintenance apparatus includes the operation and maintenance task to be executed by the service agent device, and may further include an identification of the service agent device, so as to facilitate identification of the service agent device by the operation and maintenance apparatus.

In operation S402, an operation and maintenance service is executed according to the operation and maintenance instruction.

The operation and maintenance instruction is the instruction issued by the operation and maintenance apparatus to the service agent device, and the service agent device performs the corresponding operation and maintenance task according to the operation and maintenance instruction. The operation and maintenance instruction includes, but is not limited to, an upgrade instruction, a query instruction for running state of process, and a query instruction for version number.

In some embodiments, before receiving the operation and maintenance instruction, the method further includes sending registration information to the operation and maintenance apparatus.

The registration information includes a service capability interface of the service agent device. Each service agent device corresponds to one service capability interface, which may be the identification of the service agent device and represents the service capability of the service agent device. Or, a plurality of service agent devices share one service capability interface, the service capability interface numbers the service agent devices, and the service capability of each of the service agent devices may also be determined through the service capability interface.

In some embodiments, after sending the registration information to the operation and maintenance apparatus and before receiving the operation and maintenance instruction, the method further includes: acquiring operation and maintenance data; and sending the operation and maintenance data to the operation and maintenance apparatus, so as to allow the operation and maintenance apparatus to determine an operation and maintenance service capability of an agent service module based on the operation and maintenance data.

The service agent device collects the operation and maintenance data, and reports the operation and maintenance data to the operation and maintenance apparatus through the service capability interface, so as to allow the operation and maintenance apparatus to analyze the operation and maintenance data to obtain the service capability of the service agent device. The operation and maintenance data includes one or more of operation environment parameter, system state, service process state, and service index of the service module in the container.

The operation and maintenance apparatus may determine the operation and maintenance service capability of the service agent device based on the operation and maintenance data. When the operation and maintenance apparatus obtains the operation and maintenance service capabilities of a plurality of service agent devices, the operation and maintenance apparatus may determine, according to the operation and maintenance data of each service agent device, the operation and maintenance service capability corresponding to the service agent device. The operation and maintenance service capability is the capability of the service agent device to implement the operation and maintenance service.

According to the operation and maintenance method provided by the present embodiment, the operation and maintenance instruction is received, and the operation and maintenance service is executed according to the operation and maintenance instruction. The operation and maintenance service capability is the service capability of the service agent device determined based on the operation and maintenance data of the container, and the operation and maintenance task is performed by the service agent device, so that the operation and maintenance management mode is simplified, and the problem of difficulty in operation and maintenance management of large-capacity containers is solved. Moreover, since the service agent device and the service data of the containers can adopt different networks for transmission, the influence of operation and maintenance management on the service data is avoided, and the transmission efficiency of the service data is increased.

In a third aspect, a present embodiment provides an operation and maintenance apparatus, which can simplify the operation and maintenance management mode and solve the problem of difficulty in operation and maintenance management of large-capacity containers.

Figure 5:
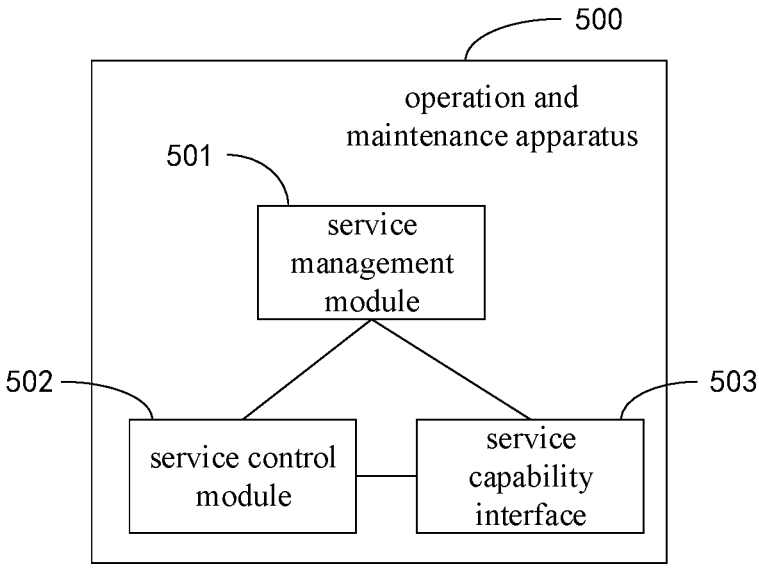
FIG. 5 is a schematic structural diagram of an operation and maintenance apparatus according to an embodiment of the present disclosure.

FIG. 5 is a schematic structural diagram of an operation and maintenance apparatus according to an embodiment of the present disclosure. As shown in FIG. 5, the operation and maintenance apparatus 500 includes:

a service management module 501 configured to manage an operation and maintenance service capability provided by a service agent device.

The service management module 501 manages all modules in the operation and maintenance apparatus and the service agent device. For being capable of being discovered and managed by a service control module, the service agent device and all the modules in the operation and maintenance apparatus need to be registered in the service management module 501. The service management module 501 is configured to maintain availability of the operation and maintenance service capability and is also configured to provide a service discovery mechanism.

The service agent device is provided in a container, and serves as an agent for interaction between service processes in the container and a service control module 502 to provide an operation and maintenance service for the operation and maintenance apparatus.

The service control module 502 is configured to determine the service agent device and an operation and maintenance instruction corresponding to the service agent device based on an operation and maintenance request and the operation and maintenance service capability of the service agent device.

The service control module 502 is a consumer of the service capability. After the service control module 502 obtains the operation and maintenance request, the service control module 502 determines the service agent device to execute the operation and maintenance request based on the operation and maintenance request and the operation and maintenance service capability of the service agent device, determines an operation and maintenance task for each service agent device, and determines the operation and maintenance instruction based on the operation and maintenance task.

Illustratively, when the operation and maintenance request is an upgrade request, the service control module 502 determines, based on the upgrade request, that three service agent devices need to be upgraded. Thus, the service control module 502 generates three upgrade instructions, and sends the upgrade instructions to the determined three service agent devices.

A service capability interface 503 is configured to receive the operation and maintenance instruction and send the operation and maintenance instruction to the service agent device for the service agent device to execute the operation and maintenance instruction.

The service capability interface 503 may be discovered and managed by the service management module 501 merely after being registered in the service management module 501.

The service capability interface 503 is configured to send operation and maintenance data collected by the service agent device to the service management module 501, receive the operation and maintenance instruction issued by the operation and maintenance apparatus, and send the operation and maintenance instruction to the service agent device.

Figure 6:
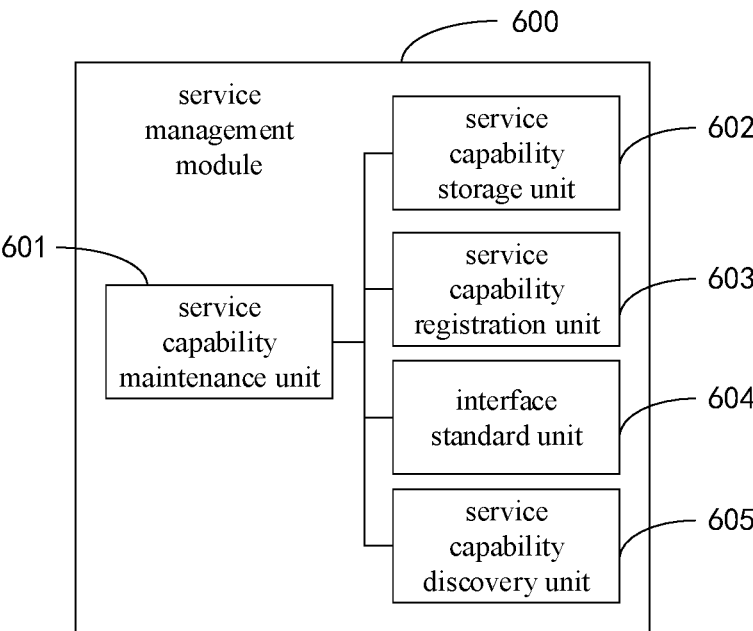
FIG. 6 is a schematic structural diagram of a service management module according to an embodiment of the present disclosure.

FIG. 6 is a schematic structural diagram of a service management module according to an embodiment of the present disclosure. As shown in FIG. 6, a service management module 600 includes:

a service capability maintenance unit 601 configured to maintain the operation and maintenance service capability of the service agent device.

The operation and maintenance service capability of the service agent device is changed with a change of service processes in the container. Therefore, the service agent device reports the operation and maintenance data to the service capability maintenance unit 601, so as to allow the service capability maintenance unit 601 to continuously update the operation and maintenance service capability of the service agent device based on the operation and maintenance data.

In some embodiments, the service capability maintenance unit 601 periodically acquires the operation and maintenance data, and updates the operation and maintenance service capability of the service agent device based on the operation and maintenance data.

The service agent device is deployed in the container and configured to serve as the agent for the interaction between the service processes in the container and the service control module, and the operation and maintenance service capability of the service agent device is changed with the change of the service processes in the container. Therefore, the service agent device reports the operation and maintenance data to the service management module periodically, so as to allow the service management module to continuously update the operation and maintenance service capability of the service agent device.

A service capability storage unit 602 is configured to store the service agent device and the corresponding operation and maintenance service capability.

In present embodiment, the service agent device and the corresponding operation and maintenance service capability are stored for the subsequent search and determination of the service agent device and determination of the operation and maintenance instruction.

In some embodiments, the service management module 600 further includes:

a service capability registration unit 603 configured to acquire registration information of the service agent device and register the service agent device.

The service agent device sends the registration information to the operation and maintenance apparatus to register a service capability interface corresponding to the service agent device in the operation and maintenance apparatus. The service agent device is provided in the container and provides the operation and maintenance service, and the registration information includes information of the service capability interface corresponding to the service agent device. The operation and maintenance apparatus may discover the service capability of the service agent device through the service capability interface.

In some embodiments, the service agent device collects the operation and maintenance data, and reports the operation and maintenance data to the operation and maintenance apparatus through the service capability interface, and the operation and maintenance apparatus may be aware of the operation and maintenance service capability of the service agent device by analyzing the operation and maintenance data.

In some embodiments, the service management module 600 further includes:

an interface standard unit 604 configured to give a standardized definition to the service capability interface.

The standardized definition includes one or more of type, execution time, execution script, and execution result of the operation and maintenance instruction. The interface standard unit 604 standardizes the service capability interface, and unifies the operation and maintenance operations, thereby reducing the requirements on the skills of the operation and maintenance staffs.

In some embodiments, the service management module 600 further includes:

a service capability discovery unit 605 configured to discover the service capability interface, so as to allow the service control module 502 to search for the operation and maintenance service capability of each service agent device.

Figure 7:
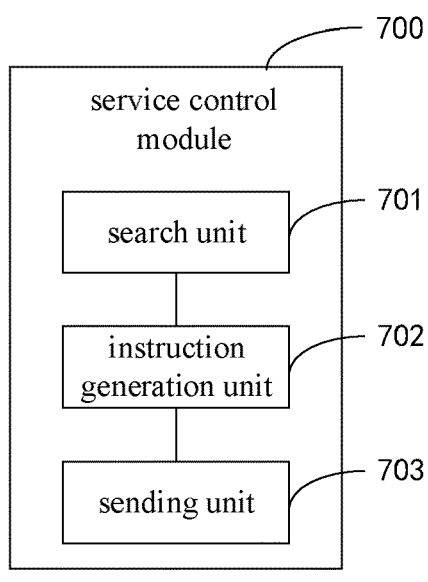
FIG. 7 is a schematic structural diagram of a service control module according to an embodiment of the present disclosure.

FIG. 7 is a schematic structural diagram of a service control module according to an embodiment of the present disclosure. As shown in FIG. 7, a service control module 700 includes:

a search unit 701 configured to search for the operation and maintenance service capability based on the operation and maintenance request to obtain the service agent device to execute the operation and maintenance request.

Since the service management module manages the operation and maintenance service capability of the service agent device and has a function of searching for the operation and maintenance service capability, the search unit 701 initiates a search request to the service management module after receiving the operation and maintenance request, and the service management module searches for the available operation and maintenance service capability to obtain the service agent device to execute the operation and maintenance request.

In some embodiments, the service agent device is bound to the service capability interface, and the service management module may be aware of the operation and maintenance service capability of the service agent device by directly searching for the service capability interface.

It should be noted that the service capability interface may include one or more containers, that is, the service capability interface stores an operation and maintenance service capability of at least one service agent device. In addition, the operation and maintenance request may be for one service agent device or for a plurality of service agent devices.

When the operation and maintenance request needs to be executed by a plurality of service agent devices, the number of the service agent devices found by search exceeds one.

An instruction generation unit 702 is configured to generate the operation and maintenance instruction based on the operation and maintenance request and the operation and maintenance service capability of the service agent device.

When the operation and maintenance request needs to be executed by a plurality of service agent devices, the instruction generation unit 702 generates an operation and maintenance instruction for each of the service agent devices.

A sending unit 703 is configured to send the operation and maintenance instruction to the service agent device corresponding to the operation and maintenance instruction for the service agent device to execute the operation and maintenance instruction.

In some embodiments, the service control module 700 further includes a receiving unit and a service capability determination unit. The receiving unit is configured to receive the operation and maintenance data sent from the service agent device. The service capability determination unit is configured to determine the operation and maintenance service capability of the service agent device based on the operation and maintenance data from the service agent device.

The operation and maintenance data includes one or more of operation environment parameter, system state, service process state, and service index of a service module in the container. The operation and maintenance management module may determine the operation and maintenance service capability of the service capability device through one or more of the operation environment parameter, the system state, the service process state, and the service index.

In some embodiments, the operation and maintenance apparatus further includes a signal transmission interface configured to receive the operation and maintenance request and return an execution result of the operation and maintenance service to the user.

The operation and maintenance request is a request initiated by the user, and may be initiated manually by the user or may be initiated automatically. For example, the operation and maintenance request is initiated by the user through an APP, or is automatically initiated by the user through a terminal. When the request is automatically initiated through the terminal, the user may preset a condition for initiating the operation and maintenance request at the terminal; and when the set condition is met, the terminal initiates the operation and maintenance request.

In addition to receiving the operation and maintenance request, the signal transmission interface may also be used for sending of the result of the operation and maintenance service to the APP or the terminal of the user. For example, after executing the operation and maintenance instruction, the service agent device sends the execution result to the service control module, and then the service control module sends the execution result to the APP of the user through the signal transmission interface.

With the operation and maintenance apparatus provided by the present embodiment, the operation and maintenance service capability is obtained through the service management module, the service control module queries the service management module based on the operation and maintenance request to obtain the service agent device to execute the operation and maintenance service, and generates the operation and maintenance instruction corresponding to the service agent device, and the operation and maintenance instruction is sent to the service agent device through the service capability interface for the service agent device to execute the operation and maintenance instruction. Thus, the operation and maintenance management mode is simplified, and the problem of difficulty in operation and maintenance management of large-capacity containers is solved; moreover, since the service agent device and the service data of the container can adopt different network for transmission, the influence of operation and maintenance management on the service data is avoided, and the transmission efficiency of the service data is increased.

In a fourth aspect, a present embodiment provides a service agent device, which is provided in a container and is responsible for interaction between service processes and an operation and maintenance apparatus.

Figure 8:
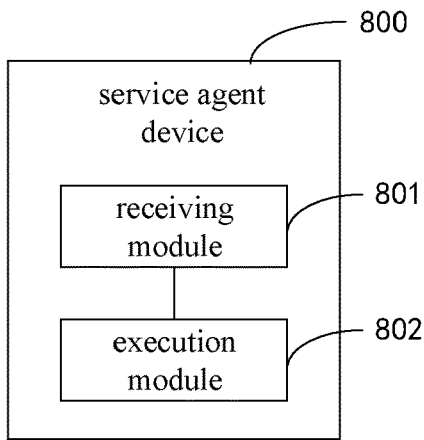
FIG. 8 is a schematic structural diagram of a service agent device according to an embodiment of the present disclosure.

FIG. 8 is a schematic structural diagram of a service agent device according to an embodiment of the present disclosure. As shown in FIG. 8, a service agent device 800 includes:

a receiving module 801 configured to receive an operation and maintenance instruction.

The operation and maintenance instruction is an instruction which corresponds to a service agent device to execute the operation and maintenance service and which is determined by an operation and maintenance apparatus searching for an operation and maintenance service capability based on an operation and maintenance request; and the operation and maintenance service capability is a capability of the service agent device to implement the operation and maintenance service.

A service control module in the operation and maintenance apparatus queries a service management module based on the operation and maintenance request, obtains available service agent devices, and determines the service agent device to execute the operation and maintenance request and the corresponding operation and maintenance instruction based on the operation and maintenance service capability.

It should be noted that an execution object of the operation and maintenance request may be one service agent device or a plurality of service agent devices, and one or more service agent devices may be determined by the service control module based on the operation and maintenance service capability to execute the operation and maintenance request. When a plurality of service agent devices are determined, the service control module further determines an operation and maintenance instruction corresponding to each of the service agent devices.

An execution module 802 is configured to execute the operation and maintenance service according to the operation and maintenance instruction.

Figure 9:
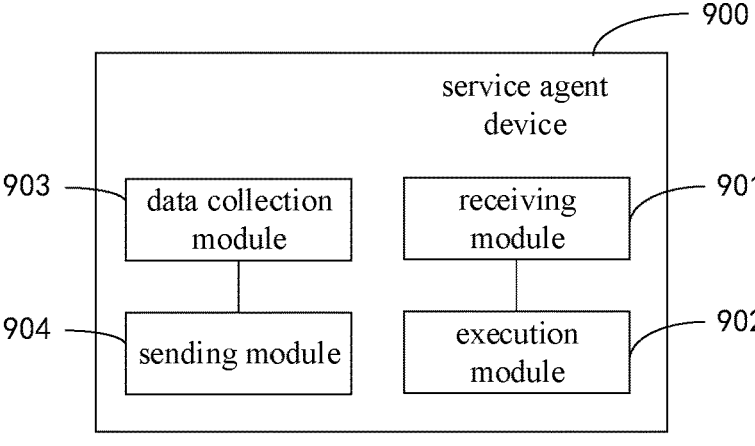
FIG. 9 is another schematic structural diagram of a service agent device according to an embodiment of the present disclosure.

FIG. 9 is another schematic structural diagram of a service agent device according to an embodiment of the present disclosure. As shown in FIG. 9, a service agent device 900 includes:

a receiving module 901 configured to receive an operation and maintenance instruction.

The operation and maintenance instruction is an instruction which corresponds to a service agent device to execute an operation and maintenance service and which is determined by an operation and maintenance apparatus searching for an operation and maintenance service capability based on an operation and maintenance request; and the operation and maintenance service capability is a capability of the service agent device to implement the operation and maintenance service. The operation and maintenance request may be initiated manually by a user, for example, the operation and maintenance request is initiated by the user through an APP. The operation and maintenance request may also be automatically initiated by a terminal used by the user.

A service control module in the operation and maintenance apparatus queries a service management module based on the operation and maintenance request, obtains available service agent devices, and determines the service agent device to execute the operation and maintenance request and the corresponding operation and maintenance instruction based on the operation and maintenance service capability.

It should be noted that an execution object of the operation and maintenance request may be one service agent device or a plurality of service agent devices, and one or more service agent devices may be determined by the service control module based on the operation and maintenance service capability to execute the operation and maintenance request. When a plurality of service agent devices are determined, the service control module further determines an operation and maintenance instruction corresponding to each of the service agent devices.

An execution module 902 is configured to execute the operation and maintenance service according to the operation and maintenance instruction.

A data collection module 903 is configured to collect operation and maintenance data of a container.

The operation and maintenance data includes one or more of operation environment parameter, system state, service process state, and service index of a service module in the container. The operation and maintenance apparatus may determine the operation and maintenance service capability of the service agent device through one or more of the operation environment parameter, the system state, the service process state, and the service index.

A sending module 904 is configured to send the operation and maintenance data to the operation and maintenance apparatus.

The sending module 904 sends the operation and maintenance data of the container collected by the data collection unit 903 to the operation and maintenance apparatus, for example, the sending module 904 sends the operation and maintenance data of the container to the service management module in the operation and maintenance apparatus, so as to allow the service management module to determine the operation and maintenance service capability of the service agent device based on the operation and maintenance data.

In some embodiments, the sending unit 904 is further configured to send registration information to the operation and maintenance apparatus, with the registration information including a service capability interface of the service agent device.

In some embodiments, the service agent device further provides service capabilities such as a data upload capability, a data download capability, a message forward capability, a system interface capability, a service interface capability, and a basic-function support capability. The data upload capability is a capability of providing a data upload function and transferring data to a specified directory. The data download capability is a capability of providing a browsing function and a download function of files in a specified directory. The message forward capability is a capability of forwarding an operation and maintenance message to a service module. The system interface capability is a capability of providing a system-interface call function in the container. The service interface capability is a capability of providing an interactive function interface for the service module. The basic-function support capability is a capability of providing various defined registration capabilities and state maintenance capabilities of operation and maintenance capability.

With the service agent device provided by the present embodiment, the receiving module receives the operation and maintenance instruction, and the execution module executes the operation and maintenance instruction, which is the instruction corresponding to the service agent device, which is determined by the operation and maintenance apparatus searching for the operation and maintenance service capability based on the operation and maintenance request, to execute the operation and maintenance service. Thus, the service agent device can simplify the operation and maintenance management mode, and solves the problem of difficulty in operation and maintenance management of large-capacity containers; moreover, since the service agent device and the service data of the container can adopt different networks for transmission, the influence of operation and maintenance management on the service data is avoided, and the transmission efficiency of the service data is increased.

In a fifth aspect, an embodiment of the present disclosure provides an operation and maintenance management system, including an operation and maintenance apparatus and a service agent device, which are in signal connection with each other. The operation and maintenance apparatus adopts the operation and maintenance apparatus provided by the embodiments of the present disclosure; and the service agent device adopts the service agent device provided by the embodiments of the present disclosure. Functional modules of the operation and maintenance apparatus and the service agent device may be found in the corresponding embodiments, and will not be described in detail here.

With the operation and maintenance management system provided by the present embodiment, the operation and maintenance apparatus determines the service agent device and the operation and maintenance instruction based on the operation and maintenance request and the operation and maintenance service capability of the service agent device, and the service agent device executes the corresponding operation and maintenance instruction, so that the operation and maintenance management mode is simplified, and the problem of difficulty in operation and maintenance management of large-capacity containers is solved; moreover, since the operation and maintenance data between the service agent device and the operation and maintenance apparatus can be transmitted through a network different from a network for transmission of the service data in the container, the influence of operation and maintenance management on the service data is avoided, and the transmission efficiency of the service data is increased.

In a sixth aspect, an embodiment of the present disclosure provides a server, which includes a virtual container, and further includes an operation and maintenance management system. The operation and maintenance management system adopts the operation and maintenance management system provided by the above embodiment, and the service agent device is provided in the container and is configured to collect the operation and maintenance data of each service module in the container and execute the corresponding operation and maintenance instruction.

With the server provided by the present embodiment, the service agent device is provided in the container; and after the operation and maintenance apparatus determines the service agent device and the operation and maintenance instruction based on the operation and maintenance request and the operation and maintenance service capability of the service agent device, the service agent device executes the corresponding operation and maintenance instruction. Thus, the operation and maintenance management mode is simplified, and the problem of difficulty in operation and maintenance management of large-capacity containers is solved; moreover, since the operation and maintenance data between the service agent device and the operation and maintenance apparatus can be transmitted through a network different from a network for transmission of the service data in the container, the influence of operation and maintenance management on the service data is avoided, and the transmission efficiency of the service data is increased.

In order to enable a better understanding of an invention intention of the present disclosure, the operation and maintenance management system and the operation and maintenance method provided by the present disclosure are described below by taking a 5G network as an example.

FIG. 10 is a schematic diagram illustrating an application scenario of an operation and maintenance system according to an embodiment of the present disclosure. The application scenario is a 5G network, and as shown in FIG. 10, the following 5G network elements are included.

An Authentication Server Function (AUSF) is configured to implement authentication and authorization of users.

An Access and Mobility Management Function (AMF) is configured to receive all connection and session-related information from user equipment (UE), and is merely responsible for handling connection and mobility management tasks.

A Session Management Function (SMF) is configured for session management such as session establishment, session modification, and session release, and includes channel maintenance between a User Plane Function (UPF) and AN nodes.

A Session Control Protocol (SCP) is configured to control session protocols.

A Network Slice Selection Function (NSSF) is configured to determine, according to slice selection assistance information and subscription information of a UE, a network slice instance to which the UE is allowed to have access.

A Network Exposure Function (NEF) is configured to be responsible for management of open network data, collection, analysis and recombination of network capacity, and exposure of network capacity.

An NF Repository Function (NRF) is configured to perform registration, management, and state detection of NFs, and implement automated management of all NFs. When each NF is started, the NF needs to register with the NRF for providing services, and the registration information includes an NF type, an address, a service list, etc.

A Policy Control Function (PCF) is configured for a unified policy framework and to provide policies and rules for control plane functions.

A Unified Data Management (UDM) function is configured for 3GPP AKA authentication, user identification, access authorization, registration, mobility, subscription, short message management, etc.

An Application Function (AF), which refers to various services of an application layer, may be an internal application of an operator or an AF (e.g., a video server or a game server) of a third party.

A User Plane Function (UPF) is configured for routing and forwarding of user data packets, data interaction with an external data network, processing of quality of service of a user plane, and implementation of flow control rules (such as gating, redirection, and flow diversion).

A Data Network (DN) is configured to provide a data network for services of an operator, the internet or services of a third party.

A Radio Access Network (RAN) is configured to provide an access service for terminals.

A User Equipment (UE) is used for broadcast paging and processing of radio resource control connection.

An Operation (OP) system is configured to perform operation and maintenance management on network elements which may be the above entities, and may also be other entities in the 5G network that are not described herein.

The service agent device is provided in an image of the container and operates along with the network elements, and the operation and maintenance apparatus is connected to the service agent device through a network. Moreover, a connection network between the operation and maintenance apparatus and the service agent device may be an operation and maintenance network independent of the 5G service network, or may be the 5G service network. However, in order to avoid the influence of the operation and maintenance service on the service data, the operation and maintenance network independent of the 5G service network is preferred.

FIG. 11 is a schematic diagram illustrating a start process of an operation and maintenance management system according to an embodiment of the present disclosure. As shown in FIG. 11, when an image of the AMF is instantiated, a service agent device in the image is started accordingly. A start process of the service agent device corresponding to the AMF includes the following operations.

In operation S1101, the image of the AMF is instantiated.

During the instantiation of the image of the AMF, services of network elements in the AMF are pulled up, and the service agent device is also pulled up.

In operation S1102, the service agent device registers with the operation and maintenance apparatus.

The service agent device registers with the service management module in the operation and maintenance apparatus through the service capability interface, so as to allow the service management module to be aware of a corresponding relationship between the service agent device and the service capability interface.

In operation S1103, the service agent device sends the operation and maintenance data of the container to the operation and maintenance apparatus.

The service agent device sends the operation and maintenance data of the container to the service management module in the operation and maintenance apparatus, so as to allow the service management module to be aware of the operation and maintenance service capability of the service agent device.

In operation S1104, the service agent device in the container provides the operation and maintenance service capability to the operation and maintenance apparatus, so as to be called by the service control module in the operation and maintenance apparatus.

After being started, the operation and maintenance management system may provide the operation and maintenance service for the user. FIG. 12 is a schematic diagram illustrating a service process of an operation and maintenance management system according to an embodiment of the present disclosure. As shown in FIG. 12, an operation and maintenance management process includes the following operations.

In operation S1201, in response to the operation and maintenance request, the service management module searches the operation and maintenance service capabilities of all the service agent devices for the operation and maintenance service capability of a corresponding operation and maintenance function, and determines the service capability interface to execute the operation and maintenance request.

In operation S1202, the service control module sequentially calls the determined service capability interface, and sends the operation and maintenance instruction to the service agent device corresponding to the service capability interface.

The operation and maintenance instruction includes one or more of a data upload instruction, a data download instruction, an instruction to forward a message to the service module in the container, and a system operation instruction (such as an upgrade instruction).

In operation S1203, after the service agent device receives a call for a specified service function interface, the service agent device executes the operation and maintenance instruction, and obtains the execution result.

In operation S1204, the execution result is sent to the operation and maintenance apparatus through the service capability interface.

The operation and maintenance method and the operation and maintenance apparatus provided by the present embodiment may be applied to not only the 5G network but also other containerized Internet.

Figure 13:
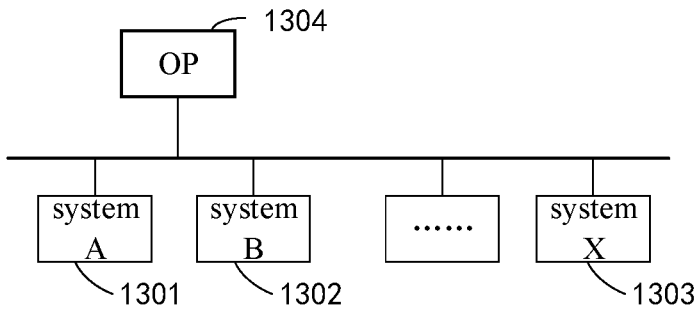
FIG. 13 is a schematic diagram illustrating another operation and maintenance application scenario according to an embodiment of the present disclosure.

FIG. 13 is a schematic diagram illustrating another operation and maintenance application scenario according to an embodiment of the present disclosure. As shown in FIG. 13, a system A 1301, a system B 1302 . . . and a system X 1303 are connected through the Internet, and an OP 1304 is connected to the system A 1301, the system B 1302 . . . and the system X 1303 through the Internet or another independent network. At least one of the systems adopts a plurality of containers to jointly provide service functions. The service agent device provided by the present disclosure is provided in the containers, the operation and maintenance apparatus is configured to uniformly control and manage the service agent device which provide the operation and maintenance service.

Figure 14:
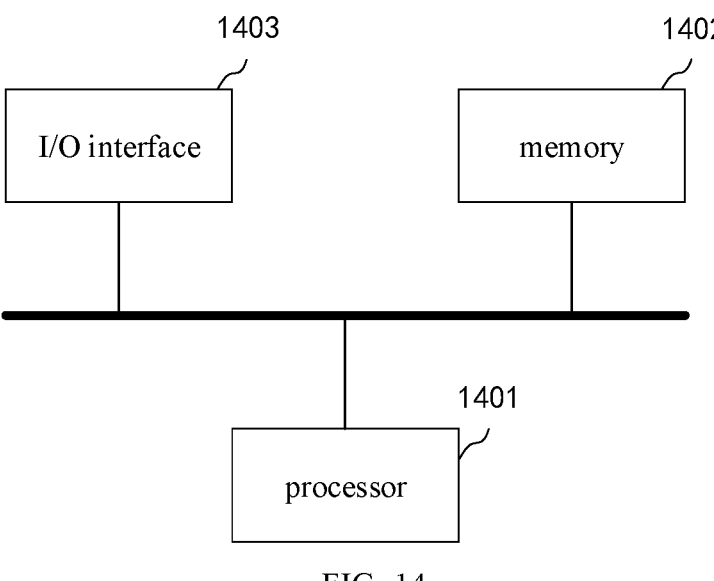
FIG. 14 is a schematic structural diagram of an electronic device according to an embodiment of the present disclosure.

In a seventh aspect, referring to FIG. 14, an embodiment of the present disclosure provides an electronic device, including:

one or more processors 1401;

a memory 1402 having stored thereon one or more programs which, when executed by the one or more processors, cause the one or more processors to implement the operation and maintenance method described in any one of the above embodiments; and one or more I/O interfaces 1403 connected between the processor(s) and the memory and configured to enable information interaction between the processor(s) and the memory.

The processor 1401 is a device having a data processing capability, and includes, but is not limited to, a Central Processing Unit (CPU); the memory 1402 is a device having a data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH); and the I/O interface (read/write interface) 1403 is connected between the processor 1401 and the memory 1402, may enable the information interaction between the processor 1401 and the memory 1402, and includes, but is not limited to, a data bus (Bus).

In some embodiments, the processor 1401, the memory 1402, and the I/O interface 1403 are connected to each other through a bus, and then are connected to other components of a computing device.

In an eighth aspect, an embodiment of the present disclosure provides a computer-readable medium having stored thereon a computer program which, when executed by a processor, implements the operation and maintenance method described in any one of the above embodiments.

It should be understood by those of ordinary skill in the art that the functional modules/units in all or some of the operations, the systems and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. An operation and maintenance method, comprising:

searching for an operation and maintenance service capability based on an operation and maintenance request to determine a service agent device and an operation and maintenance instruction corresponding to the service agent device, wherein the service agent device is provided in a container and provides an operation and maintenance service, and the operation and maintenance service capability is a service capability of the service agent device determined based on operation and maintenance data of the container; and sending the operation and maintenance instruction corresponding to the service agent device to the service agent device for the service agent device to execute the operation and maintenance instruction;

wherein the operation and maintenance data comprises at least one of operation environment parameter, system state, service process state, or service index of the container.

2. The method of claim 1, wherein searching for the operation and maintenance service capability based on the operation and maintenance request to determine the service agent device and the operation and maintenance instruction corresponding to the service agent device comprises:

searching for the operation and maintenance service capability of the service agent device based on the operation and maintenance request to determine the service agent device to execute the operation and maintenance request and an operation and maintenance task corresponding to the service agent device; and determining the operation and maintenance instruction corresponding to the service agent device based on the operation and maintenance task corresponding to the service agent device.

3. The method of claim 2, wherein searching for the operation and maintenance service capability of the service agent device based on the operation and maintenance request to determine the service agent device to execute the operation and maintenance request and the operation and maintenance task corresponding to the service agent device comprises:

searching for a service capability interface based on the operation and maintenance request to determine the service agent device to execute the operation and maintenance request and the operation and maintenance task corresponding to the service agent device;

wherein the service capability interface corresponds to the service agent device.

4. The method of claim 3, before searching for the operation and maintenance service capability based on the operation and maintenance request to determine the service agent device and the operation and maintenance instruction corresponding to the service agent device, further comprising:

receiving registration information sent from the service agent device, wherein the registration information comprises the service capability interface corresponding to the service agent device; and storing the registration information of the service agent device.

5. The method of claim 1, before searching for the operation and maintenance service capability based on the operation and maintenance request to determine the service agent device and the operation and maintenance instruction corresponding to the service agent device, further comprising:

receiving and storing the operation and maintenance data sent from the service agent device; and determining the operation and maintenance service capability of the service agent device based on the operation and maintenance data.

6. The method of claim 1, after sending the operation and maintenance instruction corresponding to the service agent device to the service agent device for the service agent device to execute the operation and maintenance instruction, further comprising:

receiving feedback information returned from the service agent device after executing the operation and maintenance instruction.

7. An operation and maintenance method applicable to a service agent device which is provided in a container and provides an operation and maintenance service, comprising:

receiving an operation and maintenance instruction, wherein the operation and maintenance instruction is an instruction which corresponds to a service agent device to execute the operation and maintenance service and which is determined by an operation and maintenance apparatus searching for an operation and maintenance service capability based on an operation and maintenance request; and the operation and maintenance service capability is a capability of the service agent device to implement the operation and maintenance service; and executing the operation and maintenance service according to the operation and maintenance instruction, wherein before receiving the operation and maintenance instruction, the method further comprises:

sending registration information to the operation and maintenance apparatus;

acquiring operation and maintenance data, wherein the operation and maintenance data comprises one or more of operation environment parameter, system state, service process state, or service index of a service module in the container; and sending the operation and maintenance data to the operation and maintenance apparatus, so as to allow the operation and maintenance apparatus to determine the operation and maintenance service capability of a service agent device based on the operation and maintenance data.

8. The method of claim 7, wherein the registration information comprises a service capability interface of the service agent device.

9. An operation and maintenance apparatus, comprising:

a service manager configured to manage an operation and maintenance service capability provided by a service agent device; wherein the service agent device is provided in a container and provides an operation and maintenance service, and the operation and maintenance service capability is a capability of the service agent device to implement the operation and maintenance service;

a service controller configured to determine the service agent device and an operation and maintenance instruction corresponding to the service agent device based on an operation and maintenance request and the operation and maintenance service capability of the service agent device, wherein the operation and maintenance request is a request made by a user; and a service capability interface configured to receive the operation and maintenance instruction and send the operation and maintenance instruction to the service agent device for the service agent device to execute the operation and maintenance instruction, wherein the service controller comprises:

a receiver configured to receive operation and maintenance data sent from the service agent device, wherein the operation and maintenance data comprises at least one of operation environment parameter, system state, service process state, or service index of the container; and a service capability decision generator configured to determine the operation and maintenance service capability of the service agent device based on the operation and maintenance data from the service agent device.

10. The apparatus of claim 9, wherein the service manager comprises:

a service capability maintainer configured to maintain the operation and maintenance service capability of the service agent device; and a service capability storage configured to store the service agent device and the corresponding operation and maintenance service capability.

11. The apparatus of claim 10, wherein the service manager further comprises:

a service capability register configured to acquire registration information of the service agent device and register the service agent device.

12. The apparatus of claim 10, wherein the service capability maintainer periodically acquires operation and maintenance data, and updates the operation and maintenance service capability of the service agent device based on the operation and maintenance data.

13. The apparatus of claim 10, wherein the service manager further comprises:

an interface standard generator configured to give a standardized definition to the service capability interface.

14. The apparatus of claim 13, wherein the standardized definition comprises at least one of type, execution time, execution script, and execution result of the operation or maintenance instruction.

15. The apparatus of claim 9, wherein the service controller further comprises:

a receiver configured to search for the operation and maintenance service capability based on the operation and maintenance request to obtain the service agent device to execute the operation and maintenance request;

an instruction generator configured to generate the operation and maintenance instruction based on the operation and maintenance request and the operation and maintenance service capability of the service agent device; and a transmitter configured to send the operation and maintenance instruction to the service agent device corresponding to the operation and maintenance instruction for the service agent device to execute the operation and maintenance instruction.

16. The apparatus of claim 9, further comprising:

a signal transmission interface configured to receive the operation and maintenance request and return an execution result of the operation and maintenance service.

* * * * *